United States Patent
Borlaug

(10) Patent No.: US 12,407,409 B2
(45) Date of Patent: Sep. 2, 2025

(54) SINGLE-SIDEBAND REDUCED-CARRIER PHASE-SHIFTING ELECTRO-OPTIC MODULATOR

(71) Applicant: RAYTHEON COMPANY, Waltham, MA (US)

(72) Inventor: David Byron Borlaug, Harbor City, CA (US)

(73) Assignee: Raytheon Company, Arlington, VA (US)

(*) Notice: Subject to any disclaimer, the term of this patent is extended or adjusted under 35 U.S.C. 154(b) by 262 days.

(21) Appl. No.: 18/214,487

(22) Filed: Jun. 26, 2023

(65) Prior Publication Data

US 2024/0430006 A1 Dec. 26, 2024

(51) Int. Cl.
*H04B 10/11* (2013.01)
*H04B 10/516* (2013.01)

(52) U.S. Cl.
CPC .......... *H04B 10/11* (2013.01); *H04B 10/516* (2013.01)

(58) Field of Classification Search
CPC ............................. H04B 10/11; H04B 10/516
USPC ........................................................ 398/115
See application file for complete search history.

(56) References Cited

U.S. PATENT DOCUMENTS

| | | | |
|---|---|---|---|
| 8,879,916 B1 | 11/2014 | Ng et al. | |
| 2012/0002978 A1* | 1/2012 | Healey ............... | H04B 10/5165 398/183 |
| 2020/0109229 A1* | 4/2020 | Sommazzi ............ | C08F 297/02 |

FOREIGN PATENT DOCUMENTS

| | | | |
|---|---|---|---|
| CA | 2221445 A1 | * | 11/1996 |
| JP | 2008271286 A | * | 11/2008 |
| KR | 20110042390 A | * | 4/2011 |

OTHER PUBLICATIONS

Murata et al; Optical Suppressed-Carrier Single Side-Band Modulator/ Optical Frequency Shifter Utilizing Three-Branch Waveguide Interferometer and Polarization-Reversed Structure; Sep. 2006, Proceedings of the 36th European Microwave Conference; pp. 1-3. (Year: 2006).*

Rory et al; Pseudo-arbitrary sideband generation by phase modulation calculated with iterative phase retrieval; Jun. 2023; Optics Express vol. 31, No. 13 and pp. 1-14. (Year: 2023).*

(Continued)

*Primary Examiner* — Amritbir K Sandhu

(57) ABSTRACT

Circuit and method for electro-optic modulation of an RF signal to produce a single-sideband reduced-carrier phase-shifted (SSB-RC-PS) modulated signal includes: receiving an optical carrier signal; receiving the RF signal; modulating the RF signal with a first portion of the optical carrier to produce a single sideband (SSB) modulated signal; amplitude and phase modulating a second portion of the optical carrier signal and combining with the modulated signal to produce a first combined signal, the amplitude modulation and phase modulation of the second portion of the optical carrier signal are dynamically controlled to directly match the amplitude and inversely match the phase of the modulated signal; and amplitude modulating and phase modulating a third portion of the optical carrier signal and combining third portion with the first combined signal to produce the second combined signal, the product of which is a single sideband reduced carrier phase shifted (SSB-RC-PS) modulated signal.

14 Claims, 3 Drawing Sheets

(56) References Cited

OTHER PUBLICATIONS

Sabri et al; Single Sideband Suppressed Carrier Modulation with Spatiotemporal Metasurfaces at Near-Infrared Spectral Regime; Jun. 2022; Journal of ligthwave Technology vol. 40, No. 12, pp. 1-12. (Year: 2022).*

Han et al., "Single-Chip Integrated Electro-Optic Polymer Photonic RF Phase Shifter Array," Journal of Lightwave Technology, Dec. 2003, vol. 21, No. 12, pp. 3257-3261.

International Search Report and Written Opinion of the International Searching Authority dated Oct. 17, 2024 in connection with International Patent Application No. PCT/US2024/035623, 11 pages.

Ferreira et al., "Highly Linear Integrated Optical Transmitted for Subcarrier Multiplexed Systems," IEEE Photonics Technology Letters, vol. 21, No. 7, Apr. 2009, 3 pages.

* cited by examiner

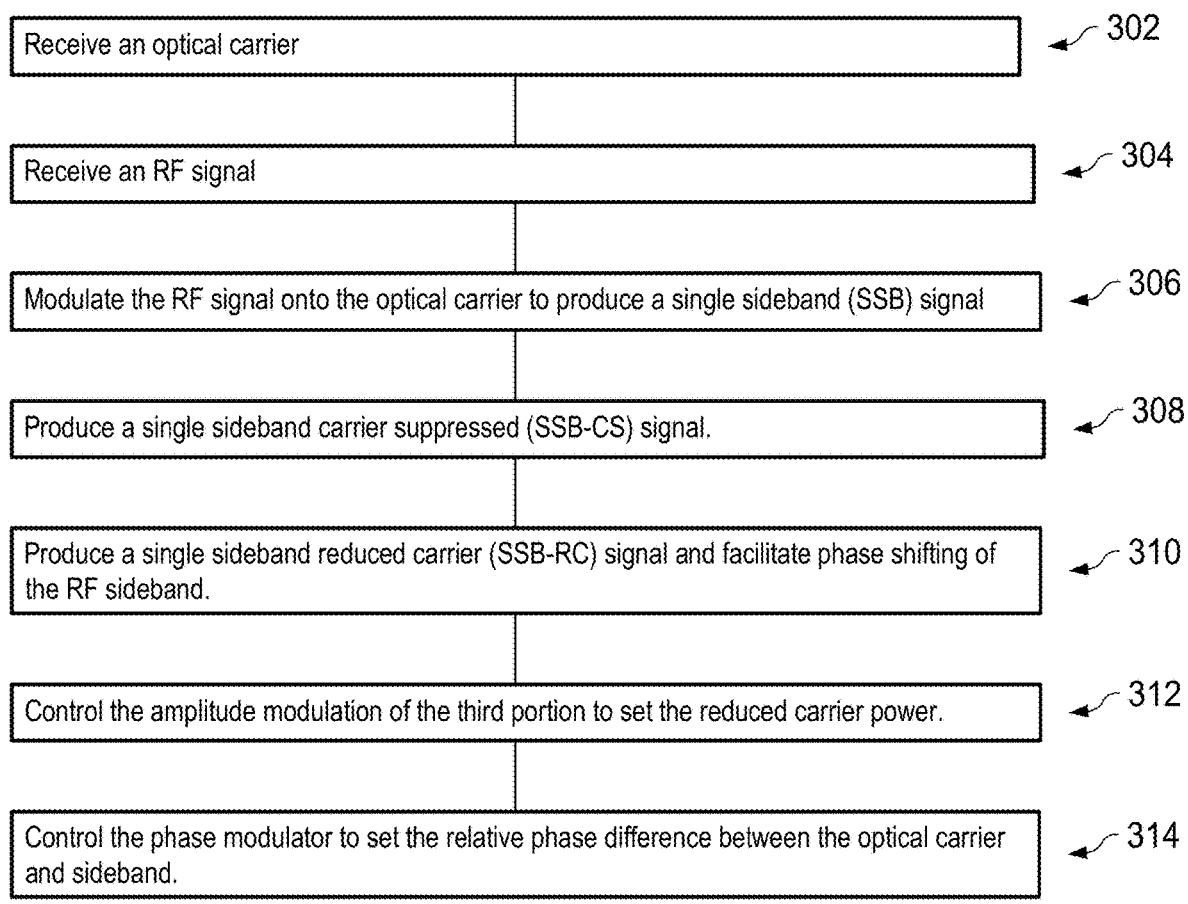

SINGLE-SIDEBAND REDUCED-CARRIER PHASE-SHIFTING ELECTRO-OPTIC MODULATOR

FIELD

The present disclosure generally relates to electro-optical circuits and more particularly to a single-sideband reduced-carrier phase-shifting electro-optic modulator (SSB-RC-PS-EOM).

BACKGROUND

Radio-frequency (RF) photonic systems use the strengths of electronics and photonics together to benefit analog RF applications, such as communications and radar applications. Electronics is the dominant technology for analog to digital conversion, digital signal processing, and data storage, while photonics supports terahertz of bandwidth, long-distance low-loss signaling, and simple analog signal processing. RF photonics requires efficient electro-optic modulator (EOM) for modulation of analog electrical signals to the optical domain.

An EOM is a signal-controlled device that modulates laser light based on an electronic analog or digital signal. The modulation may be imposed on the phase, frequency, amplitude, or polarization of the laser light. For conventional EOMs, modulation bandwidths extending into the gigahertz range are possible. Common applications of EOMs include digital data telecommunications and radio frequency (RF) analog signal transmission.

An EOM's performance is quantified by its bandwidth and switching voltage, known as V_pi. One EOM figure of merit is bandwidth/V_pi. Improvements to EOM performance are sought by improving the strength of the electro-optic effect via material science efforts, designing improved electro-optic mode overlap, matching the velocity of electrical and optical waves, and including resonant optical and electronic structures.

SUMMARY

The present disclosure uses optical circuitry to perform lower the effective V_pi of the aggregate circuit. This is done via the present disclosure's single-sideband reduced carrier phase-shifting electro-optic modulator circuitry.

In some embodiments, the disclosure is directed to a circuit and a method for RF interference prediction (detection) and avoidance.

In some embodiments, the disclosure is directed to a single-sideband reduced-carrier phase-shifting electro-optic modulator (SSB-RC-PS-EOM). The modulator includes: an optical port for receiving an optical carrier signal; a radio frequency (RF) port for receiving an RF signal; a single-sideband (SSB) modulator for modulating the RF signal with a first portion of the optical carrier, shifting the RF signal to a frequency spectrum of the optical carrier signal and producing a modulated signal; a carrier suppression circuit to amplitude modulate and phase modulate a second portion of the optical carrier to produce an equal amplitude phase shifted optical signal with a phase opposite to phase of the modulated signal. The amplitude and phase modulation of the carrier suppression circuit are dynamically controlled to directly match the amplitude and inversely match the phase of the modulated signal. The modulator further includes: a first combiner to combine the modulated signal from the SSB modulator with the amplitude matched and phase shifted optical signal to produce a first combined optical signal; a carrier injection circuit to amplitude modulate and phase modulate a third portion of the optical carrier to produce an amplitude and phase modulated optical signal, wherein phase and amplitude modulation of the carrier injection circuit is dynamically controlled; and a second combiner to combine the first combined optical signal and the amplitude and phase modulated optical signal to produce a reduced carrier optical signal, as an optical output signal.

In some embodiments, the disclosure is directed to a method for electro-optic modulation of a radio frequency (RF) signal to produce a single-sideband reduced-carrier phase-shifted (SSB-RC-PS) modulated signal. The method includes: receiving an optical carrier signal; receiving the RF signal; modulating the RF signal with a first portion of the optical carrier to produce a single sideband (SSB) modulated signal; amplitude modulating and phase modulating a second portion of the optical carrier signal and combining with the modulated signal to produce a first combined signal, the product of which is a single sideband carrier suppress (SSB-CS) modulated signal, wherein the amplitude modulation and phase modulation of the second portion of the optical carrier signal are dynamically controlled to directly match the amplitude and inversely match the phase of the modulated signal; and amplitude modulating and phase modulating a third portion of the optical carrier signal and combining third portion with the first combined signal to produce the second combined signal, the product of which is a single sideband reduced carrier phase shifted (SSB-RC-PS) modulated signal.

In some embodiments, the power split ratios for the first portion, second portion, and third portion are dynamically controlled to increase efficiency and reduce optical attenuation. The phase shift on the RF signal is used to accomplish serrodyning. Dynamically controlling the carrier to sideband ratio, modulation depth, effective V_pi, and SOA gain implements an automatic gain control.

In some embodiments, for the third portion of the optical carrier signal, the modulation of the optical carrier is controlled to set the carrier to sideband ratio and modulation depth. This modulation of the optical carrier may further be controlled to set an effective V_pi.

In some embodiments, the phase modulation of the third portion of the optical carrier signal is dynamically controlled to set a static or time-varying RF phase shift, or to set a static or time-varying RF phase shift.

BRIEF DESCRIPTION OF THE DRAWINGS

The components in the figures are not necessarily to scale, emphasis instead being placed upon illustrating the principles of the disclosure. Like reference numerals designate corresponding parts throughout the different views. Embodiments are illustrated by way of example and not limitation in the figures of the accompanying drawings, in which:

FIG. 3 is a simplified process flow for electro-optic modulation of a radio frequency (RF) to produce a single-sideband reduced-carrier phase-shifting (SSB-RC-PS) modulated signal, according to some embodiments of the disclosure.

DETAIL DESCRIPTION

In some embodiments, the present disclosure is directed to a single-sideband reduced-carrier phase-shifting electro-optic modulator (SSB-RC-PS-EOM). This electro-optic modulator has many benefits for improving EOMs. Carrier reduction increases the signal modulation index--effectively reducing the modulator's switching voltage, known as V_pi. Carrier-reduction, and other integrated circuitry, enable high resolution control of the modulated RF amplitude, and can serve as automatic gain control (AGC). In some embodiments, the architecture supports independent phase shifting of the carrier with respect to the single-sideband. Also, phase shifting can be used to shift the RF sideband's phase, or to accomplish frequency shifting via serrodyning. This enables full control of the RF sideband's phase and amplitude.

Moreover, the circuit architecture makes exclusive use of materials, processes, and components available from existing commercial photonic integrated circuit (PIC), and functions over typical commercial manufacturing tolerances. SSB-RC-PS-EOM performance improves along with intrinsic improvements to EOMs.

Figure 1:
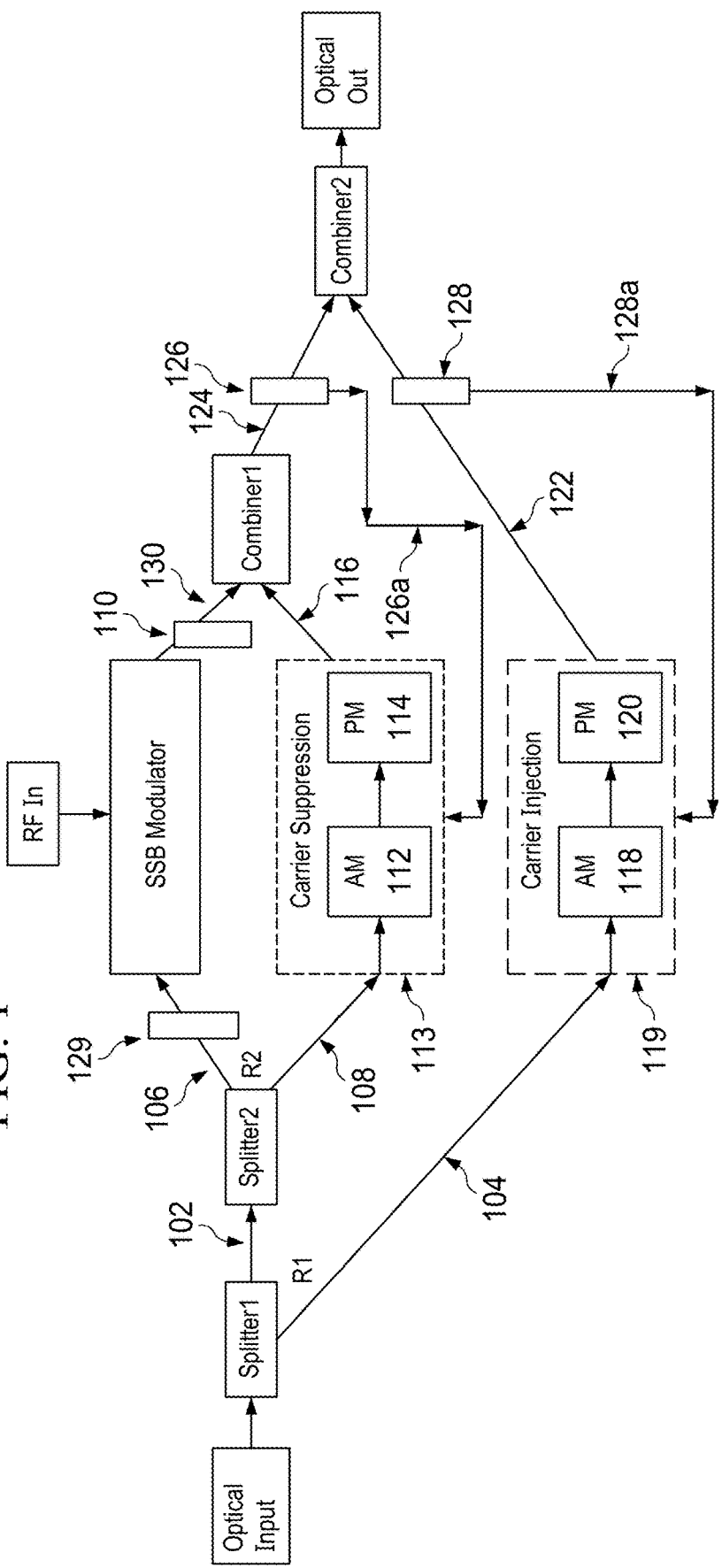
FIG. 1 shows a block diagram for a single-sideband reduced-carrier phase-shifting electro-optic modulator (SSB-RC-PS-EOM), according to some embodiments of the disclosure.

FIG. 1 shows a block diagram for a single-sideband reduced-carrier phase-shifting electro-optic modulator (SSB-RC-PS-EOM), according to some embodiments of the disclosure. As shown, an optical input port receives an optical (carrier) input signal which is split into three arms (branches); an optical SSB modulator arm, a carrier suppression 113 arm and a carrier injection 119 arm. A common frequency of the optical signal is in the range of 193.4 Terahertz (THz). The optical SSB modulator is a known (conventional) optical modulator in the art. For example, a SSB modulator can be constructed from an RF hybrid and a dual-parallel Mach Zehnder Modulator. Additionally, methods to implement DC bias control of modulators using detectors 129 and 130 are known in the art. Each of the carrier suppression 113 and carrier injection 119 arms include an amplitude modulator and a phase modulator (112/114 and 118/120, respectively). The amplitude modulators are configured to control the amplitudes of the respective signals in the carrier suppression and carrier injection arms, responsive to respective control signals 126a and 128a. Similarly, the phase modulators are configured to control the phases of the respective signals in the carrier suppression and carrier injection arms, responsive to respective control signals 126a and 128a.

In operation, an optical input signal (generated, for example, by a laser) is first (power) split by a splitter1 into a first light beam 102 and a second light beam 104. In some embodiments, the power split ratio R1 of the Splitter1 is dynamically adjusted in response to control signals 126, 128, 129, and 130 to improve power efficiency and minimize the amount of amplitude attenuation in amplitude modulators 112 and 118. The first light beam 102 is input to (another) splitter2 and the second light 104 is input to an amplitude modulator 118 of the carrier injection 113 arm. Splitter2 (power) divides the first light beam 102 by a ratio of R2 into a third light beam 106 and a fourth light beam 108. In some embodiments, the power split ratio R2 of the Splitter2 is dynamically adjusted in response to control signals 126, 128, 129, and 130 to improve power efficiency and minimize the amount of amplitude attenuation in amplitude modulators 112 and 118.

The third light beam 106 is input to the SSB modulator circuit. SSB modulator also takes an RF signal (input to an RF port) as its input, via a dual-parallel Mach-Zehnder modulator (shown as part of the optical SSB modulator). A typical frequency of the RF signal is in the range of DC to 50 GHZ, which is much lower than the frequency of the optical signal. The Mach-Zehnder modulator and RF hybrid perform the optical SSB modulation and shift the RF signal to the frequency spectrum of the optical signal and optically modulate the third light beam 106, as an output signal 110. Here, the RF hybrid is a device that equally splits the power of an electrical RF signal into two paths, and shifts one of the paths by 90 degrees, as known in the art. Also, as known in the art, a Mach-Zehnder modulator is a device used to impart a relative phase shift between two signal paths from a single source. The modulator has been used, among other things, to measure phase shifts between the two beams caused by a sample, measure a change in length of one of the paths, or to impart amplitude attenuation on to the optical beam in proportion to an electrical analog or digital data signal.

The fourth light beam 108 is input to an amplitude modulator 112 to control the amplitudes of the fourth light beam 108 in the carrier suppression (CS) 113 arm, responsive to an error signal 126a generated by an amplitude/phase control circuit 126. The amplitude of the fourth light beam 108 is (dynamically) adjusted to match the amplitude of the laser carrier from light beam 110. The amplitude-modulated fourth light beam 108 is input to a phase modulator 114 to control and shift its phase to an opposite phase of the optical laser carrier in output signal 110, responsive to the error signal 126a generated by the amplitude/phase control circuit 126 to accomplish and monitor carrier suppression. The resulting optical carrier 116 has a phase opposite to that of the phase of the optical carrier in signal 110. The optical carrier is then cancelled (carrier suppressed) from the modulated signal 110 by combining it with the optical signal 116 with an opposite phase, by a combiner1 to produce a single-sideband (SSB) carrier suppressed (CS) signal 124. This signal 124 is also used to generate the error signal 126A by the amplitude/phase control circuit 126.

The amplitude and phase of second light 104 are also adjusted by the amplitude modulator 118 and phase modulator 120 in the carrier injection 119 arm, responsive to an error signal 128a generated by an amplitude/phase control circuit 128 to achieve control of the injected carrier's amplitude and phase. The resulting carrier injection signal 122 is then combined with signal 124, by a combiner2, to produce a single-sideband reduced carrier (SSB-RC) signal, as an optical output. In some embodiments, the optical output may be amplified and then converted to an RF signal, for example, by a semiconductor optical amplifier (SOA) and photodiode.

Figure 2:
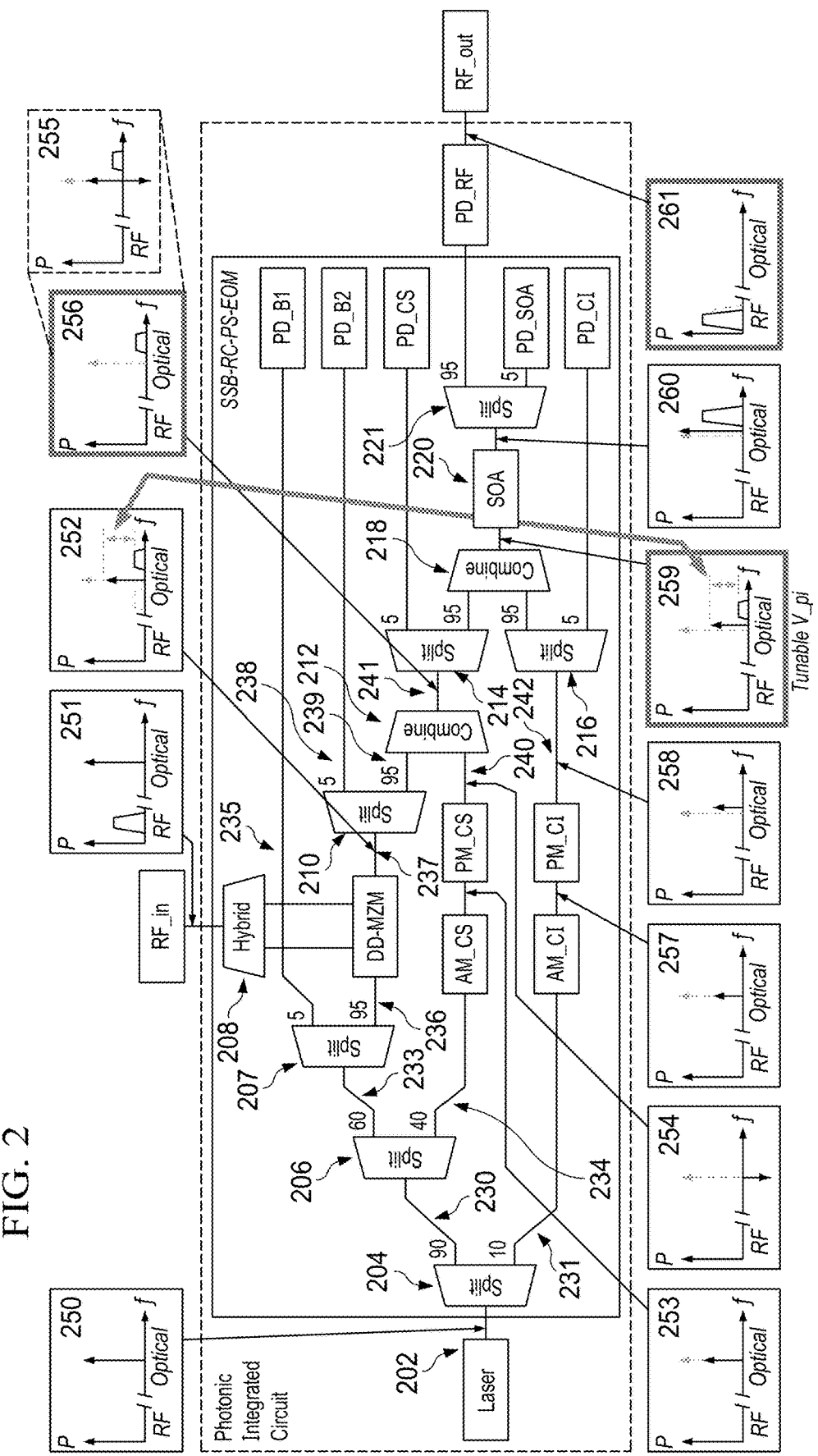
FIG. 2 depicts a more detailed block diagram and operating principle for a single-sideband reduced-carrier phase-shifting electro-optic modulator (SSB-RC-PS-EOM), according to some embodiments of the disclosure.

FIG. 2 shows a more detailed block diagram and operating principle for a single-sideband reduced-carrier phase-shifting electro-optic modulator (SSB-RC-PS-EOM), according to some embodiments of the disclosure. As shown, an optical (carrier) input signal is generated by a laser 202 and power-split to a first optical signal 230 and a second optical signal 231, by a splitter 204. In some embodiments, the input optical signal 202 may be generated by a laser and additional circuitry. An RF signal (RF_in) enters an electrical hybrid 208 where the signal is power split into two arms, with one arm leading the other in phase by 90-degrees. The two RF signals are then input to a dual-drive Mach-Zehnder modulator (DD-MZM) to perform the single-sideband electro-optic modulation. As shown, at the output of the laser and the output of RF-in, the typical frequency of the optical input signal is in the range of 193.4 terahertz, 250, which is much higher than the typical frequency of the RF signal, which is in the range of DC to 100 GHZ, 251. The first optical signal is input to another splitter 206 to power-split it into a third optical signal 233 and a fourth optical signal 234.

The third optical signal 233 is input to another splitter 207 to produce a fifth 235 and sixth 236 optical signal. The sixth optical signal, 236, is input to the DD-MZM to be combined with the two RF electrical signals resulting from the RF hybrid to produce single-sideband electro-optic modulation as shown in the plot at the output of the DD-MZM, 252. Note that the suppression of the up-converted lower RF sideband is shown by the dashed grey outline to the left of the optical carrier in 252. Only the optical carrier and single upper sideband are resultant in signal 237, shown in 252. The sixth optical signal 237 is input to another splitter 210 to produce a seventh optical signal 238 and a ninth 239 optical signal.

The fifth optical signal 235 and the seventh optical signal 238 are input to photodiodes PD_B1 and PD_B2 respectively, and are used to control the direct current (DC) bias of the DD-MZM, which is known to the prior art. The DC bias inputs to the DD-MZM, which are known to the prior art, are not shown. PD_B2 is also used in the present disclosure to estimate the optical carrier power of optical signal 239.

The fourth optical signal 234 from splitter 206 is used to suppress the optical carrier and is input to an amplitude modulator AM_CS to (dynamically) adjust its amplitude, as depicted in plot 253 at the output of the AM_CS. Note that the solid line has a reduce amplitude compared with the dashed grey line, indicating amplitude control. Also note that the amplitude resulting from AM_CS is controlled until the magnitude of the optical carrier shown by the blue arrow in plot 253 is equal to the magnitude of the blue arrow in plot 252. The amplitude-adjusted fourth optical signal 234 is then input to a phase modulator PM_CS to (dynamically) adjust its phase. The PM_CS is controlled to produce a 180 degree phase shift between optical carrier signals 239 and 240, as depicted by the upside down blue arrow 254 in the plot at the output of the PM_CS, 254.

The ninth optical signal 239 output from splitter 210 is combined with the output of the PM_CS 240 by a combiner 212 to generate a first combined signal 241, as shown in plots 255 and 256. Note that plot 255 shows the blue carrier signal from plot 252 versus the equal amplitude and opposite phase carrier signal from plot 254, which results in carrier suppression depicted in plot 256, where the blue optical carrier has been suppressed, and where only the upper RF sideband shown in red remains.

The second optical signal 231 is input to amplitude modulator AM_CI, to reduce the amplitude of the second optical signal 231 and facilitate control of the carrier injection amplitude, as shown at the output of AM_CI in plot 257. The output of the AM_CI modulator is input to a phase modulator PM_CI to (dynamically) adjust its phase, or when a repeating phase ramp is input to PM_CI in the case of serrodyning, to (dynamically) adjust its frequency, as depicted by the frequency translated optical carrier shown in plot 258.

The output of combiner 212 is power-split by splitter 214 to facilitate photodiode monitoring by PD_CS. PD_CS is used to control the input to AM_CS and PM_CS to facilitate carrier suppression. This way, maximum carrier suppression is achieved by tuning AM_CS and PM_CS until the PD_CS signal is minimized. By including both the amplitude modulator and phase modulator on a single control circuit, any non-ideal phase response in the amplitude modulator, or non-ideal amplitude response in the phase modulator, can be linearized by the control signal and digital signal processing. Additionally, in some embodiments, PD_CI and the attenuation control signal for AM_CS can be used to dynamically control the tunable split ratio of splitter 206 until the attenuation control signal for AM_CS is minimized, and the proportion of power transmitted down path 233 is maximized. Power efficiency is maximized and signal fidelity is maximized when the maximal power is transmitted down path 233 while simultaneously suppressing the carrier using path 234.

Similarly, the output of PM_CI is power-split by splitter 216 to facilitate photodiode monitoring by PD_CI. PD_CI is used to control the input to AM_CI to facilitate carrier injection. The control signal to AM_CI sets the injected carrier power, which in turn controls the carrier to sideband ratio, which is analogous to modulation depth or the EOM's effective V_pi. The power detected by PD_CI is the injected carrier power. The power detected by PD_CS, when carrier suppression is maximal, is the RF sideband power. The ratio of the carrier to sideband power is then independently controlled by setting AM_CI. PM_CI is used to set the relative phase between the carrier and the sideband. In some embodiments, the sideband phase can be detected based on the output of PD_RF, and used to create a control signal to PM_CI.

A signal from splitter 214 is combined with a signal from splitter 216, by a combiner 218 to generate a second combined signal, as shown in plot 259 at the output of the combiner 218. The ratio of the carrier to sideband power is called out in plot 259, where the difference between the carrier and sideband power is reduced (modulation depth increased), compared with that of plot 252. Again, this tunable V_pi (tunable modulation depth) is accomplished by controlling AM_CI.

The power estimation of optical signals 239, 240, 241, and 242 can be used in some embodiments to dynamically control the split ratio of tunable splitters 204, 206, and 207 to increase optical and electrical RF efficiency, and reduce the need for amplitude attention in amplitude modulators AM_CS and AM_CI.

In some embodiments, the output of the combiner 218 is the amplified by a semiconductor optical amplifier (SOA) 220 with the resulting signal plotted in 260. Note that, for an equivalent SOA, the present disclosure can increase the sideband power via linear amplification (before compression) beyond what would otherwise be possible due to the present disclosure's increased modulation depth. In some embodiments, a splitter 221 and photodiode PD_SOA are used to monitor the power produced by the SOA.

In some embodiments, the signal existing the SOA from splitter 221 is converted to an electrical RF signal by a photodiode PD_1 to generate the RF_out signal, shown in plot 261. In some embodiments, the RF signal frequency can be shifted (shown in plot 261), the RF phase can be shifted (not shown in plot 261), and the RF signal amplitude can be dynamically increased (shown in plot 261) or decreased (not shown in plot 261) with respect to the input RF signal (dashed grey line in plot 261, corresponding to original RF signal in plot 251). The more detailed block diagram of FIG. 2 includes several optional components (compare to FIG. 1) to further enhance and condition the signals. In FIG. 2, the DD-MZM represents the first arm (branch), i.e., the optical SSB modulator of FIG. 1. Similarly, the AM_CS and PM_CS represent the carrier suppression arm (branch) and AM_CI and PM_CI represent the carrier injection arm (branch).

FIG. 3 is a simplified process flow for electro-optic modulation of a radio frequency (RF) signal to produce a single-sideband reduced-carrier phase-shifted (SSB-RC-PS) modulated signal, according to some embodiments of the disclosure. As shown in block 302, an optical carrier signal is received, for example, from a laser and in block 304 the RF signal is received. In block 306, a first portion of the optical carrier and the RF_in signal produce a single sideband (SSB) modulated signal using the RF hybrid and DD-MZM.

In block 308, a single sideband carrier suppressed (SSB-CS) signal is produced. A second portion of the optical carrier is amplitude modulated and phase modulated. The second signal is combined with the first. The amplitude and phase modulation of the second portion of the optical carrier is controlled until the optical carrier from the first portion is maximally suppressed (e.g., at the output of combiner 212). Maximal suppression occurs when the carrier amplitude in the first and second paths are perfectly equal, and the carrier phase in the first and second paths are perfectly opposite. The amplitude and phase modulation of the second portion of the optical carrier signal is dynamically controlled to maximally suppress the carrier. An exemplary signal plot is shown by plots 252, 253, 254, 255, and 256, in FIG. 2.

In block 310, a single sideband reduced carrier (SSB-RC) signal is produced, and the RF sideband is phase shifted. A third portion of the optical carrier is amplitude modulated and phase modulated. The third portion is combined with the product of the combined first and second portions at combiner 218. Two tasks are accomplished using the third portion of the optical carrier.

In the first task, block 312, amplitude modulation of the third portion of the optical carrier sets the reduced carrier power. The reduced carrier power sets the sideband modulation depth. The sideband modulation depth is analogous to the modulator's effective V_pi, which is a key figure of merit for modulators. An exemplary signal plot is shown in FIG. 2.

The second task of phase modulation in block 314, sets the relative phase difference between the optical carrier and sideband. The relative phase difference between the optical carrier and sideband sets the phase shift of the photodetected electrical RF signal. A static phase shift shifts the phase of the photo-detected RF signal. A phase ramp produces serrodyning and frequency shifts the RF signal. An exemplary signal plot is shown in FIG. 2. Note the carrier's frequency plotted in 258, with the resulting frequency of 259 compared to the original carrier frequency (dashed arrow), show serrodyning.

In some embodiment, the optical output signal is amplified and/or converted to an RF output signal. In some embodiment, the monitor signals from PD_B2, PD_CS, and PD_CI, along with control signals to AM_CS and AM_CI are utilized to dynamically controlled the power splitting ratio of tunable splitters 204 and 206 to increase efficiency and decrease the attenuation in modulators AM_CS and AM_CI.

It will be recognized by those skilled in the art that various modifications may be made to the illustrated and other embodiments of the disclosure described above, without departing from the broad inventive scope thereof. It will be understood therefore that the disclosure is not limited to the particular embodiments or arrangements disclosed, but is rather intended to cover any changes, adaptations or modifications which are within the scope and spirit of the disclosure as defined by the appended claims and drawings.

The invention claimed is:

1. A single-sideband reduced-carrier phase-shifting electro-optic modulator (SSB-RC-PS-EOM) comprising:
   an optical port for receiving an optical carrier signal;
   a radio frequency (RF) port for receiving an RF signal;
   a single-sideband (SSB) modulator for modulating the RF signal with a first portion of the optical carrier signal, shifting the RF signal to a frequency spectrum of the optical carrier signal and producing a modulated signal;
   a carrier suppression circuit to amplitude modulate and phase modulate a second portion of the optical carrier signal to produce an equal amplitude phase shifted optical signal with a phase opposite to phase of the modulated signal, wherein the amplitude and phase modulation of the carrier suppression circuit are dynamically controlled to directly match an amplitude and inversely match a phase of the modulated signal;
   a first combiner to combine the modulated signal from the SSB modulator with the equal amplitude phase shifted optical signal to produce a first combined optical signal;
   a carrier injection circuit to amplitude modulate and phase modulate a third portion of the optical carrier signal to produce an amplitude and phase modulated optical signal, wherein phase and amplitude modulation of the carrier injection circuit is dynamically controlled; and
   a second combiner to combine the first combined optical signal and the amplitude and phase modulated optical signal to produce a reduced carrier optical signal as an optical output signal.

2. The SSB-RC-PS-EOM of claim 1, further comprising an optical to electrical converter to convert the optical output signal to an RF output signal.

3. The SSB-RC-PS-EOM of claim 1, further comprising an optical amplifier to amplify the optical output signal.

4. The SSB-RC-PS-EOM of claim 1, further comprising tunable optical splitters to dynamically control split ratios.

5. A method for electro-optic modulation of a radio frequency (RF) signal to produce a single-sideband reduced-carrier phase-shifted (SSB-RC-PS) modulated signal, the method comprising:
   receiving an optical carrier signal;
   receiving the RF signal;
   modulating the RF signal with a first portion of the optical carrier signal to produce a single-sideband (SSB) modulated signal;
   amplitude modulating and phase modulating a second portion of the optical carrier signal and combining with the SSB modulated signal to produce a first combined signal, a product of which is a single-sideband carrier-suppressed (SSB-CS) modulated signal, wherein the amplitude modulation and phase modulation of the second portion of the optical carrier signal are dynamically controlled to directly match an amplitude and inversely match a phase of the SSB modulated signal; and
   amplitude modulating and phase modulating a third portion of the optical carrier signal and combining with the first combined signal to produce a second combined signal, a product of which is the SSB-RC-PS modulated signal.

6. The method of claim 5, further comprising converting the SSB-RC-PS modulated signal to an RF output signal.

7. The method of claim 5, further comprising amplifying the SSB-RC-PS modulated signal.

8. The method of claim 5, wherein power split ratios for the first portion, second portion, and third portion are dynamically controlled to increase efficiency and reduce optical attenuation.

9. The method of claim 5, wherein a phase shift on the RF signal is used to accomplish serrodyning.

10. The method of claim 5, wherein dynamically controlling a carrier-to-sideband ratio, modulation depth, effective V_pi, and SOA gain implements an automatic gain control.

11. The method of claim 5, wherein for the third portion of the optical carrier signal, the modulation of the optical carrier signal is controlled to set a carrier-to-sideband ratio and modulation depth.

12. The method of claim 11, wherein for the third portion, the modulation of the optical carrier signal is further controlled to set an effective V_pi.

13. The method of claim 5, wherein the phase modulation of the third portion of the optical carrier signal is dynamically controlled to set a static or time-varying RF phase shift.

14. The SSB-RC-PS-EOM of claim 1, wherein the phase modulation of the third portion of the optical carrier signal is dynamically controlled to set a static or time-varying RF phase shift.

\* \* \* \* \*